(12) United States Patent
Xi

(10) Patent No.: US 11,968,322 B2
(45) Date of Patent: Apr. 23, 2024

(54) METHODS AND APPARATUSES OF CALL IMPLEMENTATION

(71) Applicant: BEIJING XIAOMI MOBILE SOFTWARE CO., LTD, Beijing (CN)

(72) Inventor: Chunyan Xi, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 94 days.

(21) Appl. No.: 17/734,966

(22) Filed: May 2, 2022

(65) Prior Publication Data

US 2023/0199109 A1 Jun. 22, 2023

(30) Foreign Application Priority Data

Dec. 17, 2021 (CN) .......................... 202111551689.3

(51) Int. Cl.
*H04M 1/72484* (2021.01)

(52) U.S. Cl.
CPC .............................. *H04M 1/72484* (2021.01)

(58) Field of Classification Search
CPC .................................................. H04W 1/72484
See application file for complete search history.

(56) References Cited

U.S. PATENT DOCUMENTS

| | | | | |
|---|---|---|---|---|
| 7,617,328 B2* | 11/2009 | Lewis | .................. | H04L 12/2856 709/206 |
| 7,787,600 B1* | 8/2010 | Bari | ...................... | H04M 3/387 370/352 |
| 10,182,142 B2* | 1/2019 | Woloshyn | ............ | H04M 1/7243 |
| 11,050,887 B2* | 6/2021 | Nguyen | ................ | H04M 15/56 |
| 11,064,070 B2* | 7/2021 | Engelke | .............. | H04M 1/2757 |
| 11,190,630 B1* | 11/2021 | Engelke | .......... | H04M 3/42391 |
| 11,190,637 B2* | 11/2021 | Engelke | ............... | H04M 11/066 |
| 11,523,146 B2* | 12/2022 | Liang | ................ | H04N 21/23109 |
| 2008/0168118 A1* | 7/2008 | Hickey | ................. | G06F 13/385 709/201 |
| 2008/0176548 A1* | 7/2008 | Liang | ................ | H04W 52/0229 455/419 |

(Continued)

FOREIGN PATENT DOCUMENTS

| | | | | |
|---|---|---|---|---|
| CN | 106416208 A | | 2/2017 | |
| EP | 2887733 A1 | * | 6/2015 | ........ H04W 36/0033 |
| EP | 3135022 A1 | | 3/2017 | |

OTHER PUBLICATIONS

Extended European Search Report issued in Application No. 22170677.3, dated Oct. 21, 2022, (9p).

(Continued)

*Primary Examiner* — Hai V Nguyen
(74) *Attorney, Agent, or Firm* — Arch & Lake LLP

(57) ABSTRACT

A method of call implementation. The method includes: in response to detecting an incoming call event sent by a calling device, sending, by a called device, a status message of the incoming call event to a relay device to enable the relay device prompts the incoming call event according to the status message; and after receiving a response message for the incoming call event from the relay device, transmitting, by the called device, audio data through an audio connection between the called device and the relay device to implement a call between the relay device and the calling device.

19 Claims, 8 Drawing Sheets

(56) References Cited

U.S. PATENT DOCUMENTS

| | | | |
|---|---|---|---|
| 2010/0095358 A1* | 4/2010 | Kruk | H04L 65/1073 |
| | | | 726/6 |
| 2011/0286443 A1* | 11/2011 | Wu | H04W 8/06 |
| | | | 370/310 |
| 2012/0315881 A1* | 12/2012 | Woloshyn | G06Q 10/10 |
| | | | 455/412.2 |
| 2017/0017451 A1* | 1/2017 | Sathyanarayana Raghu | |
| | | | G06F 3/1454 |
| 2017/0289266 A1* | 10/2017 | Rauenbuehler | H04M 1/72412 |
| 2018/0007587 A1* | 1/2018 | Feldman | H04W 36/185 |
| 2018/0205815 A1* | 7/2018 | Woloshyn | H04W 12/069 |
| 2018/0316798 A1* | 11/2018 | Fujimura | H04M 1/0202 |
| 2018/0338035 A1* | 11/2018 | Johnson | G06F 3/0488 |
| 2020/0128132 A1* | 4/2020 | Nguyen | H04M 1/72469 |
| 2021/0029238 A1* | 1/2021 | Chu | H04W 8/12 |
| 2021/0174347 A1* | 6/2021 | Rose | H04L 63/0428 |
| 2021/0248618 A1* | 8/2021 | Ionescu | G06Q 30/016 |
| 2022/0272095 A1* | 8/2022 | Joseph | G06F 3/0484 |
| 2023/0090396 A1* | 3/2023 | Thompson | H04L 43/0876 |
| | | | 375/257 |
| 2023/0118745 A1* | 4/2023 | Joseph | G06Q 50/16 |
| | | | 715/741 |

OTHER PUBLICATIONS

CNOA issued on application No. 202111551689.3 dated Dec. 23, 2023 with English translation, (18p).

* cited by examiner

METHODS AND APPARATUSES OF CALL IMPLEMENTATION

CROSS REFERENCE TO RELATED APPLICATION

This Application is based upon and claims the priority to Chinese Application No. 2021115516893, filed on Dec. 17, 2021, the entire content of which is incorporated herein by reference for all purposes.

FIELD

The present disclosure relates to the field of communication technologies, and more particularly, to a method and an apparatus of call implementation.

BACKGROUND

More and more users have multiple electronic devices, such as a mobile phone, a tablet computer, etc. A user may use the tablet computer to watch videos, work, etc., and use the mobile phone to read novels, chat, make and receive calls, etc. The user may encounter the following scenes: in a cast that the user is using the tablet computer, and there is an incoming call on the mobile phone, the user hopes to answer the incoming call on the mobile phone over the tablet computer; or the user may have multiple phones and hope to answer the incoming call of one mobile phone over another mobile phone.

SUMMARY

Examples of the present disclosure provide a method and an apparatus of call implementation.

According to a first aspect of the present disclosure, a method of call implementation, applicable for a called device, is provided. The method includes: in response to detecting an incoming call event sent by a calling device, sending a status message of the incoming call event to a relay device to enable the relay device prompts the incoming call event according to the status message; and after receiving a response message for the incoming call event from the relay device, transmitting audio data through an audio connection between the called device and the relay device to implement a call between the relay device and the calling device.

According to a second aspect of the present disclosure, a method of call implementation, applicable for a relay device, is provided. The method includes: displaying an incoming call interface in response to receiving a status message of an incoming call event sent by a called device; and in response to detecting an answer instruction based on the incoming call interface, transmitting audio data through an audio connection between the relay device and the called device to implement a call between the relay device and the calling device via the called device.

According to a third aspect of the present disclosure, an apparatus of call implementation, applicable for a called device, is provided. The apparatus includes a processor; a memory stored with a computer program executable by the processor; in which when the computer program is performed by the processor, the processor is configured to: in response to detecting an incoming call event sent by a calling device, send a status message of the incoming call event to a relay device to enable the relay device prompts the incoming call event according to the status message; and after receiving a response message for the incoming call event from the relay device, transmit audio data through an audio connection between the called device and the relay device to implement a call between the relay device and the calling device.

It should be noted that, the details above and in the following are exemplary and illustrative, and do not limit on the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure.

DETAILED DESCRIPTION

Figure 1:
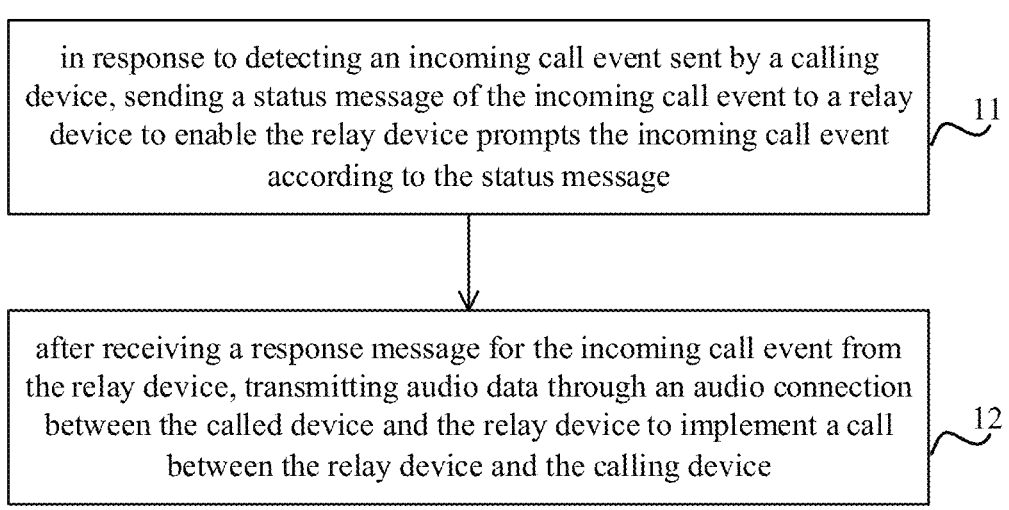
FIG. 1 is a flowchart of a method of call implementation according to an example of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims. It should be noted that features in the following embodiments and embodiments may be combined with each other without conflict.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Examples of the present disclosure provide a method of call implementation, which may be applicable for a called device. The called device may include, but not limited to, a tablet computer, a mobile phone, a personal computer, a smart TV, a big screen and other devices with a call function. A relay device that will be described below in the disclosure may include, but not limited to, a tablet computer, a mobile phone, a personal computer, a smart TV, a big screen and other devices with a call function. For the convenience of description, in examples below, the called device may be implemented by the mobile phone (phone), and the relay device may be implemented by the tablet computer (PAD). FIG. 1 is a flowchart of a method of call implementation according to an example of the present disclosure. Referring to FIG. 1, the method of call implementation may include blocks 11 to 12.

At block 11, in response to detecting an incoming call event sent by a calling device, a status message of the incoming call event is sent to a relay device to enable the relay device prompts the incoming call event according to the status message.

In this example, a device that initiates a call actively may be referred to as the calling device, and a device that receives the call sent by the calling device may be referred to as the called device; a device that is as a third device, takes the called device as an intermediate party and receives the call sent by the calling device may be referred to as the relay device. The called device detects itself whether a relay function is supported when detecting a power on signal or the incoming call event.

For example, the called device may determine whether the relay function is supported according to at least one of a version number of an in-call interface (Incallui) and whether an audio module supports voice over Internet Protocol (VoIP). The called device may be determined as supporting the relay function when the version number of the in-call interface is higher than a target version number, or when the audio module supports the VoIP, or when the version number of the in-call interface is higher than a target version number and the audio module supports the VoIP.

It should be noted that the in-call interface refers to an interface displayed during the call, which is used to distinguish an incoming call interface described later in the disclosure. The incoming call interface refers to an interface used when there is the incoming call event and before the incoming call is connected. In other words, the incoming call interface may switch to the in-call interface after a user answers the call over the relay device or the called device. Part of display contents of the incoming call interface may overlap with that of the in-call interface, such as an incoming call number or contact, a hang up button, a service provider, etc., and another part of the display contents of the incoming call interface may be different from that of the in-call interface, such as, the in-call interface includes a call duration, and the incoming call interface includes an answer button, which may be set according to specific scenes.

For another example, the called device may obtain its own model, and may be stored with a preset relay function model list. When the model of the called device is within the above relay function model list, it is determined that the called device supports the relay function. When the model of the called device is not in the above relay function model list, it is determined that the called device does not support the relay function.

For another example, the called device may obtain one or more phone accounts that currently have registered, and each phone account is an account registered for each phone call. The phone account may include at least one of a phone account representing a local call, a phone account representing a relay call, and an account representing a second call. The called device may store scenes that support the relay function. For example, the called device does not support the relay function when the called device has one phone call, or the called device does not support the relay function when the relay device has one phone call, or the called device does not support the relay function for the second phone call when the first phone call of the called device is the relay call.

When acquiring the one or more phone accounts, the called device may determine whether the one or more phone accounts include an account representing the relay call or the account representing the local call. In response to determining that the one or more phone accounts include the account representing the relay call or the account representing the local call, the called device may determine that the called device does not support the relay function; and in response to determining the one or more phone accounts do not include the account representing the relay call and the account representing the local call both, the called device may determine that the called device supports the relay function.

In an example, the called device may support four phone calls including an active call, a hold call, a ring call and a relay call. The active call may refer to a call that is ongoing. The hold call may refer to a call that is holding on. The ring call may refer to a call that is unanswered.

Figure 3:
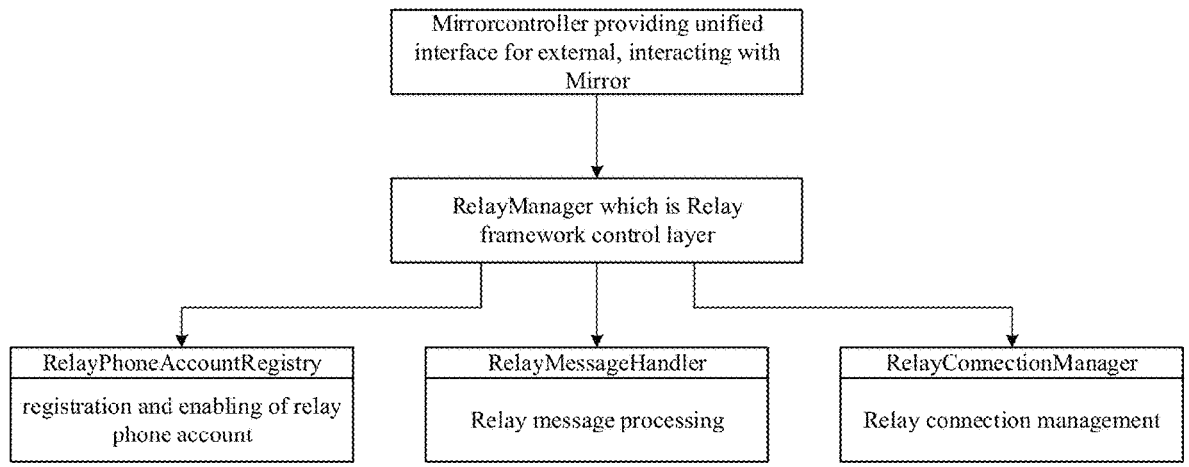
FIG. 3 is a schematic diagram of a frame of a Mirror controller according to an example of the present disclosure.

In this example, the called device may initialize a Mirror controller when determining that the called device supports the relay function. Referring to FIG. 3, the Mirror controller is an external interface class of a telephony layer in an Android system, provides a unified interface for overall relay control, interacts with MirrorSdk to perform unified management of Mirror messages and updates a status of a Mirror connection between the called device and the relay device. The Mirror controller may provide for external with a preset identifier (i.e., uniform resource identifier, URI), denoted as mirror_call_relay_active. When a value of the above preset identifier is a first value (such as 1), it means that the called device and the relay device have established a Mirror connection, and when the value of the above preset identifier is a second value (such as 0), it means that the called device and the relay device have disconnected the Mirror connection.

The Mirror controller belongs to a Mirror service, and is an interface that the Mirror service provides a service for an application layer. The Mirror controller may monitor the URI to determine the status of the Mirror connection. When the Mirror service supports the relay function, the Mirror controller may establish a relay manage service, and the relay manage service may register the phone account with a telecom layer. As another example, the Mirror controller may register a Mirror relay service and obtain an IP address of an updated socket, and may reset the IP address to null when the Mirror service dies due to system crash or exception. For another example, the Mirror controller may monitor the Mirror relay message, and a relay manager may manage establishment of a relay link (such as an audio connection) and message processing. When the Mirror service does not support the relay function, the called device may cancel the phone account and clear the relay call.

The message refers to a message specified by communication protocol, including a request message and a response message. In an example, a format of the request message may be as follows:
Relay://messageName:messageId/
messageType?{param1:value,param2:value . . . },
 where relay denotes a type of the relay, messageName denotes a name of the message, such as incoming, answer or hang up, messageId denotes an identification of the message, messageType denotes a type of the message, such as the request message or the response message, param1 denotes an operation parameter, and value denotes an operation value.

Taking an incoming call notification (i.e., status message) as an example, the format may be as follows:
relay://ring:1001/request?{"phoneNumber":
"12345678900","presentation":"1","relayDeviceName":
"miPad5" }//, where the name of the message is ring, namely, the incoming call, an ID of the message is 1001, the type of the message is request, the parameters include a phone number whose value is 12345678900, a presentation state whose value 1, and a name of the relay device whose value is miPad5.

Taking a request for operating the relay call as an example, such as answer, hang up or reject, the format may be as follows:
relay://operate:2001/request{"phoneNumber":
"12345678900","presentation":"1","relayD eviceName":
"miPad5" }//, where the name of the message is operate, the ID of the message is 2001, the type of the message is request, the parameters include a phone number whose value is 12345678900, a presentation state whose value 1, and a name of the relay device whose value is miPad5.

Taking a request for updating the status message as an example, and the format may be as follows:
relay://update:3001/request?{"phoneNumber":
"12345678900","presentation":"1","relayD eviceName":
"miPad5" }//, where the name of the message is update, the ID of the message is 3001, the type of the message is request, the parameters include the phone number whose value is 12345678900, the presentation state whose value 1, and the name of the relay device whose value is miPad5.

Taking a request for releasing the relay call as an example, and the format may be as follows:
relay://release:4001/request?{"phoneNumber":
"12345678900","presentation":"1","relayD eviceName":
"miPad5" }//, where the name of the message is release, the ID of the message is 4001, the type of the message is request, the parameters include a phone number whose value is 12345678900, a presentation state whose value 1, and a name of the relay device whose value is miPad5.

In an example, the format of the response message may be as follows:
relay://ring:1001/response?{"phoneNumber":
"12345678900","presentation":"1","relayDe viceName":
"miPad5","resultCode":"200","resultMessage":
"succeed" }//, where the name of the message is ring, namely, the incoming call, the ID of the message is 1001, the type of the message is response, the parameters include a phone number whose value is 12345678900, a presentation state whose value 1, a name of the relay device whose value is miPad5, a state code whose value is 100, and a result message whose value is succeed.

It is noted that, the called device may use the request message when actively sending the message, and may use the response message when responding to the request message received from the relay device. The relay device may use the request message when actively sending the message, and may use the response message when responding to the request message received from the called device. The called device and the relay device may automatically select the request message and the response message to transmit data. For the convenience of description, examples of the present disclosure no longer emphasizes whether the sent message is the request message or the response message. In terms of achieving an effect of transmitting the message, the corresponding solutions all fall within the scope of the present disclosure.

In this example, when it is determined that the called device supports the relay function, the called device may query the relay device. The called device may obtain a local designated account, such as a XX account, etc. It is understood that the designated account is an account used by the user when registering or an account selected when configuring the relay function. The called device may send the above designated account to a target server, such that the target server checks whether another device uploads the designated account according to the designated account, and obtains a device identification code of the device uploading the designated account. The target server may be a server specially set for matching the designated account, or a server port provided by a service provider corresponding to the designated account. Continuing to take the XX account as an example, the called device may send the XX account to the target server, and the target server may return information of the relay device that has uploaded the XX account. The called device may receive information of another device returned by the target server and takes another device as the relay device. It is understood that, after receiving the designated account sent by the called device, the target server may detect whether the designated account sent by another device is received. In response to detecting that another device has sent the designated account, the target server may send the device identification code of another device that sent the designated account to the called device, and the called device may determine the relay device based on the device identification code, that is, the relay device and the called device both have uploaded the same specified account to the target server.

It is noted that, in practical applications, the called device may be provided with a preset switch, and the preset switch is configured to control whether the called device enables the relay function. In an example, the preset switch may be a button set with reference to existing functions such as "mobile data", "Bluetooth" and so on and. When the preset switch is selected, the preset switch is in a switching-on state at this time, allowing the called device to use the relay call, when the preset switch is not selected, the preset switch is in a switching-off at this time, not allowing the called device to use the relay call. Therefore, the called device may detect a switching state of the preset switch. In response to detecting that the preset switch is in the switching-on state, the called device may determine to execute the step of sending the local designated account to the target server. In this way, the present example allows the user to use the relay function according to requirements, thus improving use experiences.

Figure 2:
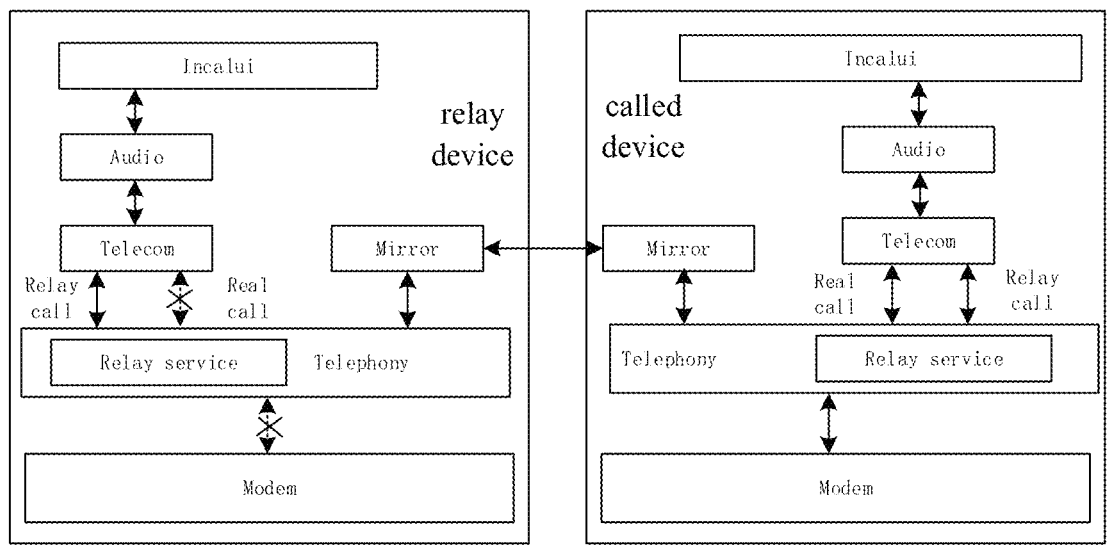
FIG. 2 is a schematic diagram of a Mirror connection according to an example of the present disclosure.

In this example, in a case of determining that the relay function is supported and detecting the relay device, the called device may establish a Mirror connection with the relay device, a presentation effect is illustrated in FIG. 2. For a process of establishing the Mirror connection, reference may be made to related arts, which will not be repeated here.

In this example, after detecting the incoming call event sent by the calling device, the called device may acquire the status message of the incoming call event. The status message may include a phone status (or call status), a phone operation (or call operation), a phone message (or call info), and the like. The phone statuses may include, but are not limited to, Incoming, Waiting, Hold, and Disconnected. The Phone operations may include, but are not limited to, Answer, Reject, and the like. The phone messages may include, but are not limited to, the phone number (or area code+phone number) of the incoming call, a contact name, and an address of the incoming call. The above status message may be set according to a specific scene, which is not limited here.

In this example, the called device may send the status message to the relay device through the Mirror connection. After receiving the status message, the relay device may display the incoming call interface and display the status message on the incoming call interface; meanwhile, the incoming call interface is also provided with an answer button and a reject button, and a presentation effect is illustrated in FIG. 6.

Figure 6:
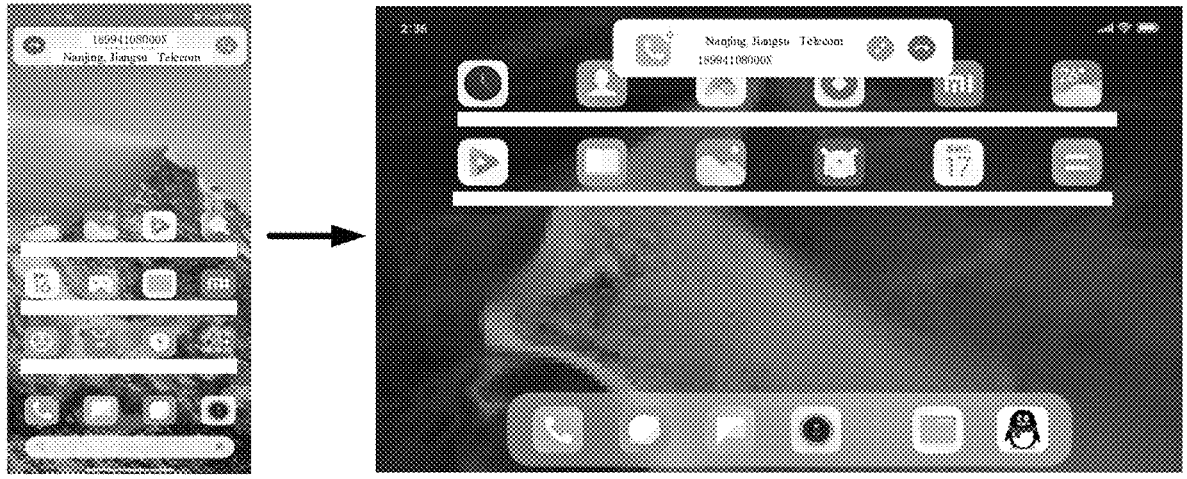
FIG. 6 is a schematic diagram of displaying a called device and a relay device simultaneously on an incoming call interface according to an example of the present disclosure.

Referring to FIG. 6, the figure on the right illustrates the presentation effect of the relay device displaying the incoming call interface, the incoming call interface of the relay device displays the phone number of the incoming call, such as "18994198000X (for illustration)", the home address corresponding to the phone number of the incoming call, such as "Nanjing, Jiangsu", and the service provider corresponding to the phone number of the incoming call, such as "Telecom".

It is noted that, in this example, the called device may display the status message in the incoming call interface of its own device while sending the status message to the relay device, and the presentation effect is illustrated in the left figure of FIG. 6. That is, while sending the status message, the called device also prepares for the call locally. In other words, when the called device receives the incoming call event, the called device and the relay device both display the incoming call interface, to facilitate the user to select the called device or the relay device to answer the call.

In an example, in addition to transmitting audio data, the Telecom layer in the called device may also control relevant behaviors of the relay device. For example, the called device may send a control signal to the relay device to control the relay device to display the incoming call interface but not ring when the relay device is in a usage state, so as to ensure that the user uses the relay device normally. Alternatively, the called device may control the relay device to display the incoming call interface and ring when the relay device is in a standby state, so as to prompt the user to pay attention to relay the incoming call. Alternatively, when the relay device is in the standby state, the called device may control the relay device not to display the incoming call notification, so as to achieve the effect of not using the relay device.

In this example, when the user of the relay device has a demand on receiving the relay call, the answer button may be triggered. After detecting that the answer button is triggered, the relay device may generate the response massage, and return the response massage through the Mirror connection. The operation information in the response massage may be answering the relay call.

Figure 4:
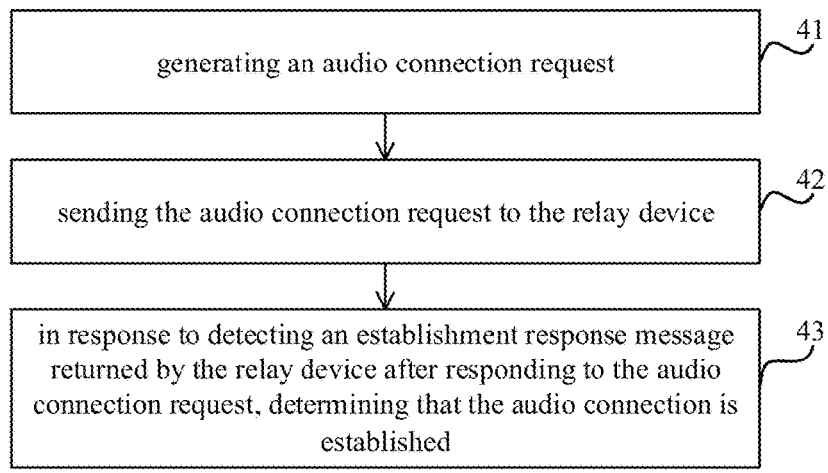
FIG. 4 is a flowchart of establishing an audio connection according to an example of the present disclosure.

In this example, referring to FIG. 4, in the block 41, after detecting the incoming call event of the calling device or receiving response massage from the relay device, the called device may generate an audio connection request. For example, the audio connection includes at least one of a Bluetooth connection, a Wi-Fi connection, a ZigBee connection and an UWB connection, which may be selected according to specific scenes. In a case that both the called device and the relay device support the above audio connection and may perform bidirectional transmission of audio data, the corresponding audio connection method falls within the scope of the present disclosure.

Figure 5:
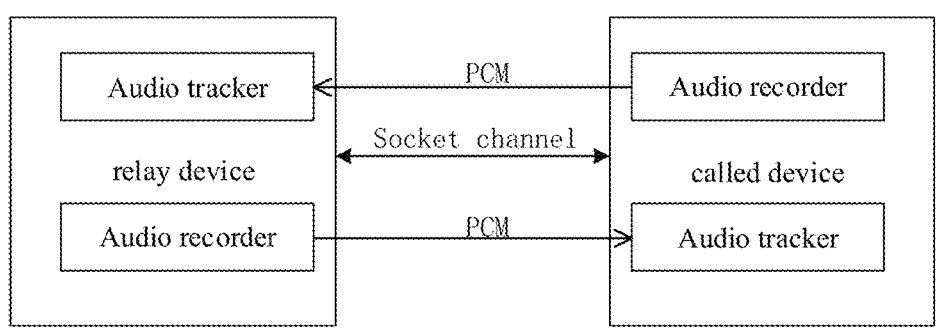
FIG. 5 is a schematic diagram of an audio connection according to an example of the present disclosure.

At block 42, the called device may send the audio connection request to the relay device. After receiving the audio connection request, the relay device may establish the audio connection with the called device, and generate an establishment response message, which indicates that the audio connection is established successfully, and then the relay device may send the establishment response message to the called device. At block 43, in response to detecting the establishment response message returned by the relay device, the called device may determine that the audio connection as illustrated in FIG. 5 has been established.

In an example, the user usually has multiple electronic devices, and each electronic device may be used as the relay device, that is, the called device may be connected to multiple relay devices. At this time, the called device may display a relay device selection interface and detect whether a selection operation of selecting the relay device is received. In response to receiving the selection operation of selecting the relay device, the called device may send the status message of the incoming call event to the relay device corresponding to the selection operation. The called device may establish the audio connection with the selected relay device, and fail to establish the audio connection with other devices due to not receiving the status message, thus failure to realizing the relay call. In this way, the solution of this example may be applied to the scene with multiple relay devices, and any relay device may be selected to make the call, which is conducive to improving experiences of using the relay function.

At block 12, after receiving the response message for the incoming call event from the relay device, the audio data is transmitted through the audio connection between the called device and the relay device to implement the call between the relay device and the calling device.

In this example, when displaying the incoming call interface illustrated on the right figure of FIG. 6, the relay device may detect whether the user operates the "answer button" or "reject button" in the incoming call interface. Taking the user triggering the answer button as an example, after detecting that the answer button is triggered, the relay device may determine that the user has the demand for receiving the current incoming call, and may generate the response message and sent the response message to the called device.

It is noted that after receiving the incoming call event, the called device may also initiate a voice acquisition element (such as microphone) and collect voice data, and then parse the voice data to obtain keywords included in the voice data. For example, the keywords may include, but not limited to, answering the call, rejecting the call, etc. The called device may generate a control instruction (such as answer instruction, reject instruction, etc.) according to the keywords and update the status messages. For specific analysis, reference may be made on the description of triggering the relevant button by the user, which will not be repeated herein.

It is noted that after receiving the incoming call event, the called device may also initiate a camera to collect an image within a preview range, and then recognize the image to obtain a user gesture or a user posture included in the image. Taking the gesture as an example, the gesture may include but not limited to a V-sign gesture, an OK-sign gesture, a hand waving gesture, etc. The called device may generate the control instruction (such as answer instruction, reject instruction, etc.) according to the gesture or the posture and update the status messages. For specific analysis, reference may be made on the description of triggering the relevant button by the user, which will not be repeated herein.

In this example, after receiving the response message from the relay device, the called device may transmit the audio data through the audio connection. In an example, the audio connection adopts the VoIP transmission scheme, that is, the voice data is transmitted in a form of data packets using IP protocol on the Internet, namely, the Voice over Internet Protocol. In this scene, a socket transmission channel is established between the called device and the relay device as the audio connection for transmitting the audio data. The presentation effect of the socket transmission channel is as illustrated in FIG. 5. Referring to FIG. 5, both the called device and the relay device are provided with an audio recorder and an audio tracker. Therefore, the audio recorder of the called device and the audio tracker of the relay device, as well as the audio recorder of the relay device and the audio tracker of the called device may share the socket channel. The called device may send the audio data through the socket channel between the audio recorder of the called device and the audio tracker of the relay device, and receive the audio data through the socket channel between the audio recorder of the relay device and the audio tracker of the called device.

Figure 7:
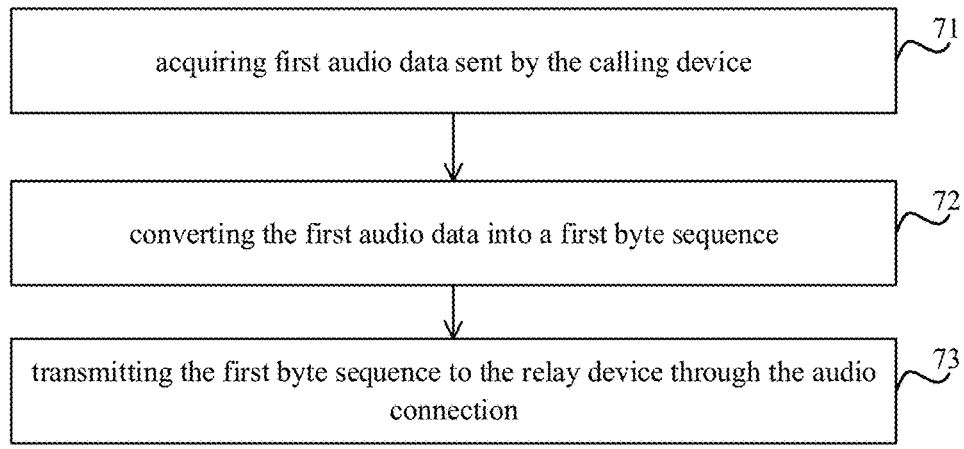
FIG. 7 is a flowchart of transmitting audio data according to an example of the present disclosure.

In an example, taking the called device sending the audio data to the relay device as an example, with reference to FIG. 7, at block 71, the called device may acquire the audio data, hereinafter referred to as first audio data for making a distinction, sent by the calling device. The calling device refers to a device that initiates the current incoming call. It may be understood that an original source of the audio data is the calling device, regardless of forwarding times during the transmission process, for example, the audio data of the calling device may pass through a server, a base station and other devices. Therefore, in this example, the audio data refers to as the first audio data of the calling device. At block 72, the called device may convert the audio data into a byte sequence, hereinafter referred to as a first byte sequence for making a distinction. In an example, the called device may convert the audio data into the byte sequence in a Gson mode, and the way of converting into the byte sequence in the Gson mode may refer to relevant arts, which will not be repeated herein. At block 73, the called device may transmit the first byte sequence to the relay device through the audio connection, such that the relay device may play the audio data. Therefore, the user of the relay device may listen to the voice of the user of the calling device.

Referring to FIG. 5, the called device may obtain the first audio data by using the audio recorder to play and record. The called device may convert the first audio data into the first byte sequence through the Gson mode, and encapsulate the byte sequence into a request message class like RequestObject, then the called device may transmit the foregoing byte sequence to the relay device in the form of request message through the socket channel, so as to achieve transmitting the audio data. For the relay device, after receiving the request message, the relay device may parse out the first byte sequence from the request message, return to the original audio data in the Gson mode, and play the audio data. It may be understood that in addition to the Gson mode, other modes with the same function, such as Jason mode, may be uses to convert the audio data into the byte sequence.

In this way, the called device as the intermediate device completes once (transmission) forwarding of the audio data.

In a cast that the relay device calls a speaker, the voice corresponding to the first audio data is returned to the original audio data through the speaker, or in a cast that the relay device calls earphones, the voice corresponding to the first audio data is returned to the original audio data through the earphones. For the user of the relay device, the user may make a response when hearing the voice. At this time, the relay device may call the acquisition element (such as microphone) to collect the voice and record the voice into the audio data, hereinafter referred to as second audio data for making the distinction. The relay device may convert the second audio data into a second byte sequence through the Gson mode, encapsulate the second byte sequence into the response message class like ResponseObject, and then send the response message to the called device through the audio connection.

Figure 8:
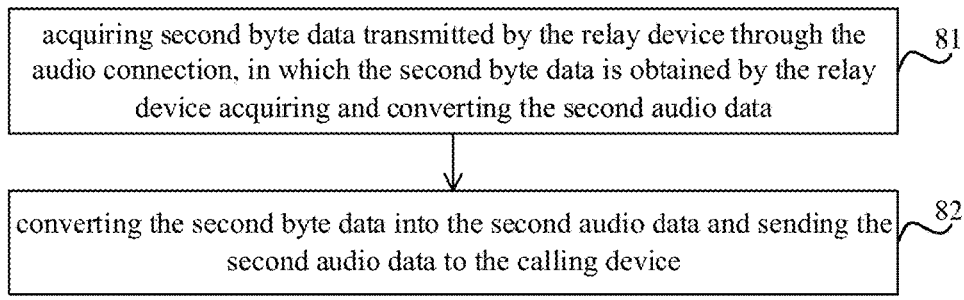
FIG. 8 is a flowchart of transmitting audio data according to another example of the present disclosure.

In another example, taking the called device receiving the audio data sent by the relay device as an example, referring to FIG. 8. At block 81, the called device may acquire the second byte sequence transmitted by the relay device through the audio connection. At block 82, the called device may send the second audio data to the calling device. Continuing to refer to FIG. 5, the above VoIP scheme is used to describe that the called device receives the audio data. The audio tracker of the called device may obtain the response message class like ResponseObject (i.e. the byte sequence) sent by the audio recorder of the relay device. After receiving the response message class like ResponseObject, the called device may parse out the byte sequence, and then the called device (such as the telephony layer of which) may return the byte sequence into the original audio data through the Gson mode and send the original audio to the calling device. In this way, the called device as the intermediate device completes once forwarding (receiving) of the audio data. That is, this example may implement the call between the relay device and the calling device over the called device as the intermediate device, so as to achieve the effect of answering the call over the relay device, which is conducive to improving the use experiences.

It is noted that the above example of the present disclosure introduces the solution of transmitting the audio data through the socket channel. It may be understood that in some other examples of the present disclosure may not use the solution of transmitting the audio data through the socket channel, but may transmit the audio data through Wi-Fi, Bluetooth and other manners, and the corresponding solution falls into the scope of the present disclosure.

In an example, after detecting that the reject button is triggered, the relay device may determine that the user rejects the current incoming call, and generate a message including a reject operation and send the message to the called device. The called device rejects the current incoming call after receiving the message including the reject operation. After rejecting the current incoming call, there is no need for transmitting the audio data between the called device and the relay device. Therefore, the called device may release the audio connection or selectively release the Mirror connection. In this way, in this example, rejecting the incoming call may be achieved on the relay device rather than rejecting the incoming call on the called device, which is conducive to improving the use experience.

Figure 9:
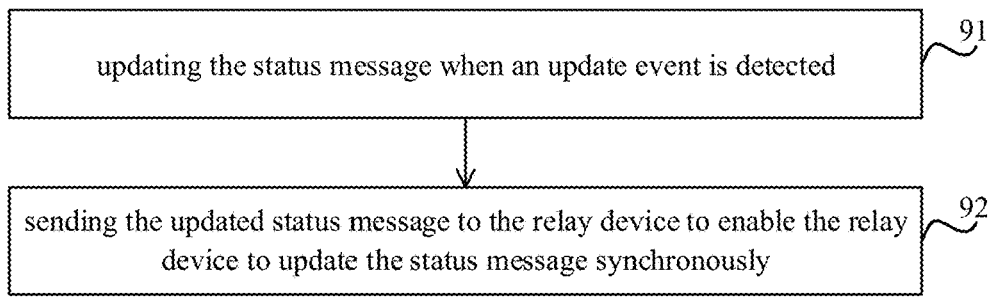
FIG. 9 is a flowchart of updating a status message according to an example of the present disclosure.

In an example, during the relay call between the called device and the relay device, the called device may also update the status message. With reference to FIG. 9, at block 91, the called device may detect an update event, which includes at least one of a call status update event and a contact message update event. For example, after receiving the incoming call event, the called device usually forwards the incoming call event timely. For example, the called device forwards the phone number first, then queries a phone book stored locally to obtain a contact name matching with the phone number, and updates the contact name into the status message, thus, under this cast the contact message update event may be detected. For another example, during the relay call, the user may first answer the call over the relay device, and then answer the call over the called device, under this case, the status message is updated as local answer, that is, the called device may detect the call status update event, and update the status message. At block 92, in response to detecting that the status message is updated, the called device may send the updated status message to the relay device to enable the relay device to update the status message synchronously. For the relay device, after receiving the updated status message, the relay device may perform a synchronization operation and display the status message on the in-call interface. After updating the status message is completed, the relay device may send the update response message to the called device. The update response message includes a result message indicating that the update successes (i.e., the resultMessage is a successful scene). After receiving the update response message, the called device may determine that the relay device has updated the status message without resending the status message. When the update response message includes a result message indicating that the update fails, the called device may resend the updated status message until the relay device completes the update.

Figure 10:
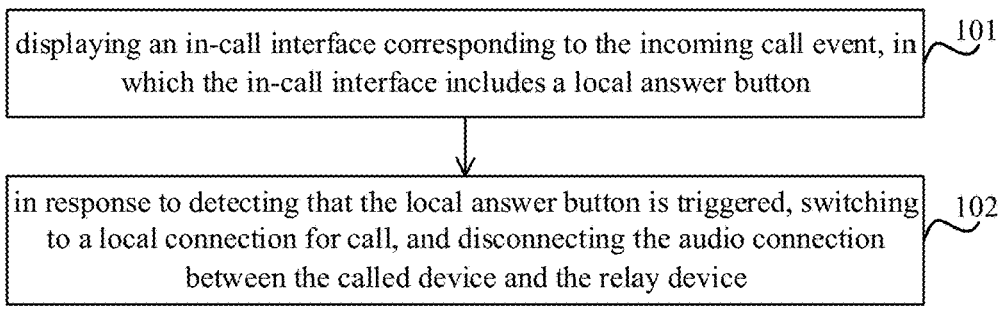
FIG. 10 is a flowchart of a called device answering an incoming call according to an example of the present disclosure.
Figure 11:
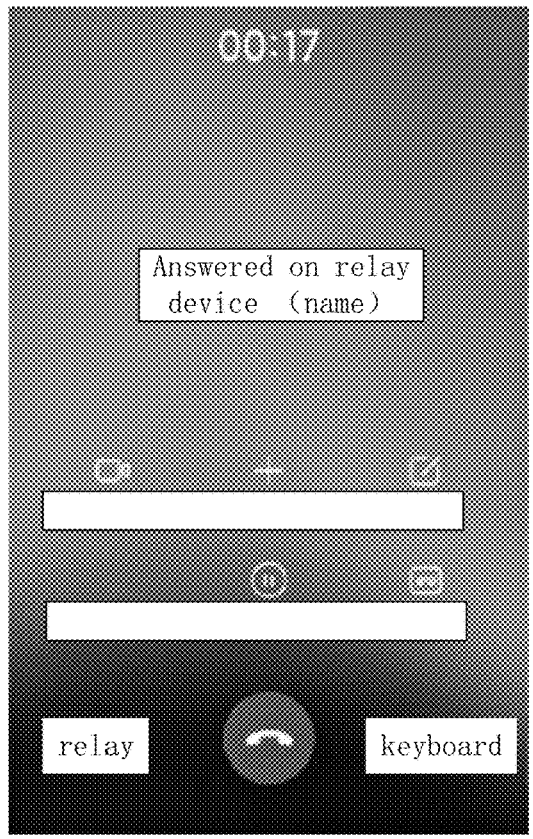
FIG. 11 is a schematic diagram of content shown in a relay device call interface when a called device answers an incoming call according to an example of the present disclosure.

Taking switching the relay call over the called device as an example, with reference to FIG. 10, during the relay call, the called device may display the in-call interface. In practical applications, the in-call interface may be zoom out to a prompt bar and displayed in a form of a bubble, so as to not affect the normal usage of the called device. At block 101, when detecting an operation characterizing displaying the in-call interface (such as, a pull-down operation or clicking on the bubble), the called device may display the in-call interface in full screen or according to a preset size. Taking displaying the in-call interface in the full screen as an example, the called device may add a content representing "answered on the relay device" on the in-call interface, and the presentation effect is illustrated in FIG. 11. In an example, the content of the in-call interface of the called device may be the content of the in-call interface of the relay device, that is, both the in-call interface of the called device and the in-call interface of the relay device display the same content. In response to detecting that the user pulls down the in-call interface or clicks the bubble, that is, detects the operation characterizing displaying the in-call interface, the called device may display the in-call interface or request the content displayed on the in-call interface from the relay device.

Figure 12:
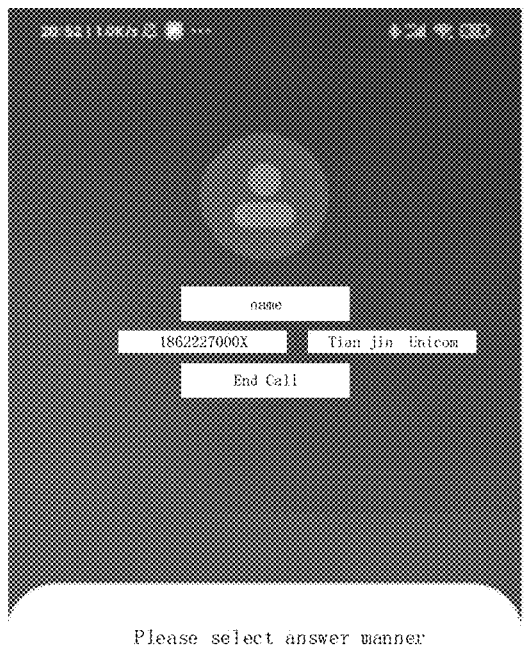
FIG. 12 is a schematic diagram of selecting an answer mode according to an example of the present disclosure.

It should be noted that considering that the called device may also answer the incoming call, the in-call interface of the called device may include a local answer button, which may be set separately, or may include representations such as Bluetooth, hands-free, handsets, and the presentation effect is illustrated in FIG. 12. Considering that the called device may also hang up the call, the in-call interface of the called device may include a local hang up button, which may be set separately, and the presentation effect is illustrated in FIG. 11.

At block 102, in response to detecting that the local answer button is triggered, the called device may make the call using a local connection (such as a real call connection in FIG. 2), send the updated status message to the relay device and disconnect the audio connection with the relay device. Since it is to be sent and received the status messages, no longer transmitting the audio data, the called device may directly end the audio connection and retain the Mirror connection, so as to achieve the effect transmitting the status messages between the called device and the relay device. For the relay device, after receiving the updated status message, the relay device may parse out a local answer message from the status message. Therefore, the relay device may also end the current relay call, and display prompt messages such as "answered over another device" or "this relay call has ended" on the in-call interface. In this way, in this example, in a process of the relay call, the called device is allowed to switch the relay call back to the called device for calling, which may meet different usage scenes and improve the use experiences.

In an example, taking hanging up the relay call on the called device as an example, the called device may display the in-call interface, which includes a local hang up button, which may be set separately, and the presentation effect is illustrated in FIG. 11. In response to detecting that the local hang up button is triggered, the called device may end the current relay call, send the updated status message to the relay device and disconnect the audio connection with the relay device. It is understandable that during the short time when the called device ends the relay call but the relay device does not end the relay call, it is to be sent and received the status messages, no longer transmitting the audio data, therefore, the called device may directly end the audio connection and retain the Mirror connection, so as to achieve the effect of transmitting the status messages between the called device and the relay device. For the relay device, after receiving the updated status message, the relay device may parse out a hang up message from the status message. Therefore, the relay device may end the current relay call, after that display prompt messages such as "this relay call has ended" or "this relay call has hung up over another device" on the in-call interface. In this way, in this example, the called device is allowed to hang up the relay call, which may meet different usage scenes and improve the use experiences.

In an example, during the relay call between the called device and the relay device, the called device may receive other incoming call events, such as a phone call, wechat video, etc. The foregoing incoming call events may affect the current relay call, or the current relay call may affect other incoming call events with higher priority lever. Therefore, in this example, the called device may adjust a priority lever of the current call to a target priority level, and the target priority level is configured to determine a relationship between the current relay call and the subsequent incoming calls, so as to determine to maintain the current call or hang up the current call. For example, when the current relay call is a wechat call, the called device displays a second call and temporarily interrupts the wechat call in response to receiving the second incoming call, and a priority level of the second incoming call is higher than a priority level of the current relay call, i.e., the wechat call, so as to ensure exclusivity of the second incoming call. For another example, when the current relay call is the wechat call, the called device may directly hang up a second wechat call in response to receiving the second wechat call, and a priority level of the second wechat call is lower than that of the current relay call, that is, the first wechat call, so as to ensure the exclusivity of the first wechat call. In this way, in this example, the call exclusivity may be ensured by adjusting the priority level of the incoming call to keep the normal call, which is conducive to improving the use experiences.

Figure 13:
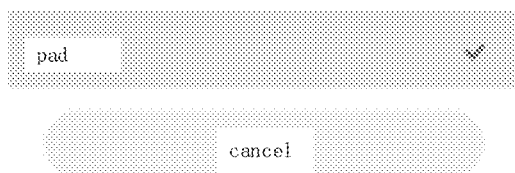
FIG. 13 is a flowchart of a method of call implementation according to an example of the present disclosure.

Examples of the present disclosure also provide a method of call implementation. As illustrated in FIG. 13, the method is applicable for a relay device and includes blocks 131-132.

At block 131, an incoming call interface is displayed in response to receiving a status message of an incoming call event sent by a called device.

In an example, when the relay device may upload a designated account to a target server in response to detecting a power on signal, such that the target server may determine whether the device is the relay device according to the designated account. The process of determining the relay device may refer to the details described in the block 11, which will not be repeated herein.

In an example, the relay device may also detect whether the relay device itself supports the relay function. In response to detecting that the relay device supports a relay function, the relay device may acquire a relay service and monitor a preset identifier, such as mirror_call_relay_active. When a value of the above preset identifier is a first value (such as 1), it means that the called device and the relay device have established a Mirror connection, and when the value of the above preset identifier is a second value (such as 0), it means that the called device and the relay device have disconnected the Mirror connection. It is understood that the relay device and the called device are to distinguish the two devices during the relay call. The same electronic device may be used as the relay device or the called device respectively, that is, the relay device may also be used as the called device. Then, the details for the relay device detecting whether relay device itself supports the relay function may refer to the examples of the called device in the block 11, which will not be repeated here.

It is noted that the relay device may receive a control signal sent by the called device to perform relevant behaviors. For example, when the above relay device is in a usage state (or an unlocked state), when receiving the control signal, the relay device may display an incoming call interface without ringing, so as to ensure that the user uses the relay device normally. For another example, when the relay device is in a standby state (or a screen lock state), the relay device may display the incoming call interface and ring, so as to prompt the user to avoid missing relay of the incoming call. When the relay device is in the standby state (or screen lock state), the relay device may not be display an incoming call notification, so as to meet a scene that the user does not use the relay device.

In this example, after establishing the mirror connection as illustrated in FIG. 2, the relay device may obtain the status message of the incoming call event, notify a Telecom layer and an Incallui layer, and finally display the above status message on the incoming call interface, and the presentation effect of which is illustrated in the right figure in FIG. 6. It is understandable that the above incoming call interface may include an answer button and a reject button.

At block 132, in response to detecting an answer instruction based on the incoming call interface, audio data is transmitted through an audio connection between the relay device and the called device to implement a call between the relay device and the calling device via the called device.

In this example, the user may answer or reject the relay call according to requirements of the user. Taking rejecting the relay call as an example, the relay device may reject the incoming call, update the status message to obtain the response message, and return the response message to the called device. The called device may reject the current incoming call after receiving the above response message and parsing out a rejection operation message.

Taking answering the current incoming call as an example, after detecting that the answer button is triggered, the relay device may generate the response message and sent the response message to the called device. The response message includes an answer operation message. After receiving the response message and parsing out the answer operation message, the called device determines that the relay device answers the current incoming call and may establish the audio connection. The called device may generate an audio connection request and send the audio connection request to the relay device.

It is noted that after receiving the incoming call event, the relay device may also initiate a voice acquisition element (such as a microphone) and collect voice data, then parse the voice data to obtain keywords included in the voice data. For example, the keywords may include, but not limited to, answering the call, rejecting the call, etc. The relay device may generate a control instruction (such as an answer instruction, a reject instruction, etc.) according to the keywords and update the status messages. For specific analysis, reference may be made on the description of triggering the relevant button by the user, which will not be repeated herein.

It is noted that after receiving the incoming call event, the relay device may also initiate a camera to collect an image within a preview range, then recognize the image to obtain a user gesture or a user posture included in the image. Taking the gesture as an example, the gesture may include but not limited to a V-sign gesture, an OK-sign gesture, a hand waving gesture, etc. The relay device may generate the control instruction (such as the answer instruction, the reject instruction, etc.) according to the gesture or the posture and update the status messages. For specific analysis, reference may be made on the description of triggering the relevant button by the user, which will not be repeated herein.

In this example, the relay device may detect whether the audio connection request is received. In response to detecting that the audio connection request is detected, the relay device may establish the audio connection with the called device. The details of establishing the audio connection may be reference with FIG. 4, which will not be repeated herein. After the audio connection is established, the relay device may generate the response message (including a result message of successful establishment of the audio connection) and send the response message to the called device, such that the called device and the relay device may transmit the audio data through the audio connection.

In this example, the relay device may obtain the request message, namely, a first byte sequence, from the called device through the audio connection, and then return to original first audio data from the first byte sequence through a Gson mode, and play the first audio data. The relay device may return to the original first audio data by calling Bluetooth, hands-free or handsets. When the relay device calls the speaker, voice of a user of the calling device is restored through the speaker, or when the relay device calls earphones, the voice of the user of the calling device is restored through the earphones.

For a user of the relay device, the user may make a response when hearing the voice. At this time, the relay device may call the acquisition element (such as the microphone) to collect the voice and record the voice as second audio data, that is, obtain the second audio data. The relay device may convert the second audio data into a second byte sequence through the Gson mode, encapsulate the second byte sequence into the response message class like ResponseObject, and then send the second byte sequence to the called device through the audio connection. The called device may forward the second audio data to the calling device, so as to realize the effect of implementing the call between the relay device and the calling device.

In an example, in response to detecting an operation indicating displaying an in-call interface, the relay device may display the call interface, and the call interface may include a hang up button. In response to detecting that the hang up button is triggered, the relay device may end the current relay call and send an updated status message to the called device to enable the called device to end the relay call synchronously and release the audio connection. In addition, the relay device may clear a call record of the current relay call, or do not write the call record directly when detecting that the current call is the relay call, so as to achieve the effect of protecting personal information.

In an example, in a process of the relay call, the called device may detect an update event, which includes at least one of a call status update event and a contact message update event. When detecting the update event, the called device may update the status message and send the status message to the relay device. After receiving the updated status message, the relay device may synchronously update the status message. For example, when a call status in the status message is updated, the updated status message includes that an operation message is answer call or reject call, and the relay device may update the displayed call status on the in-call interface. As another example, when a contact message in the status message is updated, the relay device may update the displayed contact message in the in-call interface. In this example, with the called device and the relay device synchronously updating the status messages, ensure synchronization of status messages of the two devices may be ensured, which is conducive to improving experiences of using the relay call.

In an example, after receiving the status message including the called device hanging up the call locally, the relay device may end the current call and disconnect a Mirror connection with the called device to achieve the effect of hanging up the relay call.

In an example, when the user has a demand to hang up the relay call, the relay device may be operated to display the in-call interface. In response to detecting an operation characterizing displaying the in-call interface, the relay device may display the in-call interface, which includes the hang up button. In response to detecting that the hang up button is triggered, the relay device may end the relay call and send the updated status message to the called device. Under this situation, the relay device may actively disconnect the audio connection. After receiving the above status message, the called device may synchronously end the relay call and the call with the calling device, and may also disconnect the Mirror connection with the relay device. In this way, this example may realize the effect of disconnecting the call on the relay device and improve the experiences of using the relay call.

Figure 14:
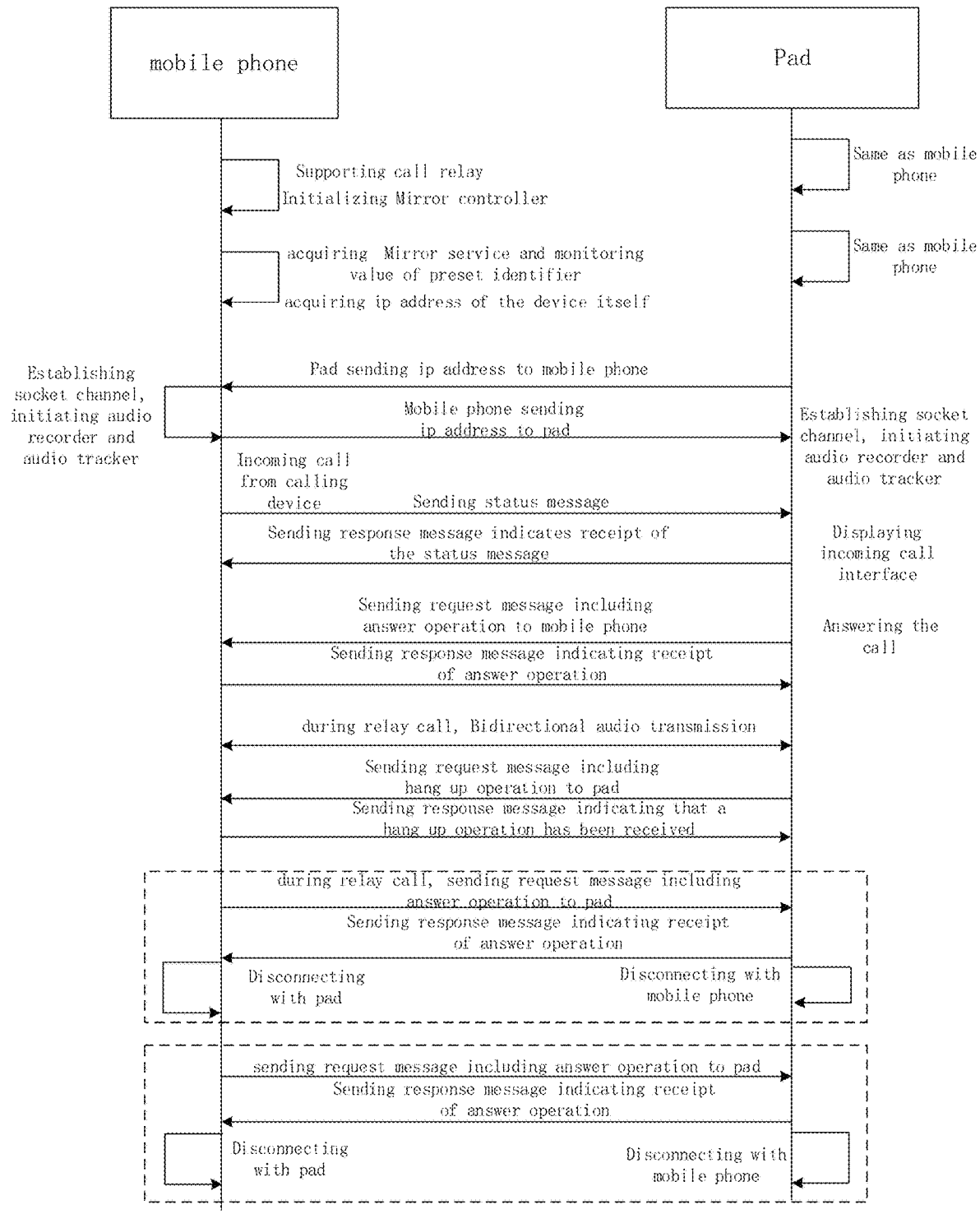
FIG. 14 is a flowchart of a method of call implementation according to an example of the present disclosure.

A method of call implementation of the present disclosure is described below by taking the called device and the relay device as a mobile phone and a pad respectively as an example. With reference to FIG. 14, the method includes the following.

The mobile phone may perform the following actions when powered on. The mobile phone may determine whether a call capability is supported. In response to determining that the call capability is supported, the mobile phone may initialize a Mirror controller. Then the mobile phone may obtain a Mirror service and monitor a value of a preset identifier. When the value of the preset identifier is 1, the mobile phone may determine that the Mirror connection has been established with the pad. The mobile phone may also obtain a local ip address. Similarly, the pad also performs the corresponding action.

Understandably, in the case of supporting call relay, the mobile phone and the pad may upload a designated account to a target server, and the target server may determine the relay device that may be used.

The pad may send its own ip address to the mobile phone. The mobile phone may establish a socket channel according to the ip address of the pad, and initiate an audio tracker and an audio recorder. The mobile phone may send its own ip address to the pad. The pad may establish the socket channel according to the ip address of the mobile phone, and initiate the audio tracker and audio recorder. In other words, an audio connection is established between the mobile phone and the pad.

In response to detecting an incoming call event sent by a calling device, the mobile phone may send a status message to the pad through the Mirror connection. After receiving the status message, the pad may display an incoming call interface in a display area. In addition, the pad may generate a response message indicating a receipt of the status message and feed response message back to the mobile phone to avoid repeated sending of the status message by the mobile phone. The incoming call interface may display a phone number of the incoming call, an address, an answer button, a reject button and other contents. When a user clicks the answer button, the pad may generate a request message including an answer operation message and send the request message to the mobile phone. The mobile phone may generate a response message indicating that the request message has been received and send response message to the pad. At this time, a relay call is established between the mobile phone and the pad, and bidirectional audio transmission is performed through the audio connection.

When the relay call is completed, the user may hang up on the pad. In response to detecting an operation of hanging up the call, the pad may end the current call and disconnect the audio connection with the mobile phone. In addition, the pad may generate a request message including the hang up operation and send the request message to the mobile phone through the Mirror connection. After receiving the above request message, the mobile phone may generate a response message indicating that the hang up operation has been received, and send the response message to the pad through the Mirror connection, and disconnects the Mirror connection with the pad. In this way, the mobile phone and the pad may end the relay call.

In an example, during the relay call, the user may answer the call over the mobile phone. In response to detecting that the user answers the call, the mobile phone may implement the call with the calling device. In addition, the mobile phone may generate a request message including the answer operation and send request message to the pad, and disconnect the audio connection with the pad. The pad may send a response message indicating the receipt of the answer operation, and may disconnect the audio connection and the Mirror connection with the mobile phone.

In an example, after sending the status message to the pad, the user may answer the call over the mobile phone. In response to detecting that the user answers the call, the mobile phone may implement the call with the calling device. In addition, the mobile phone may generate the request message including the answer operation and send request message to the pad, and disconnect the audio connection with the pad. The pad may send the response message indicating the receipt of the answer operation, and disconnect the audio connection and the Mirror connection with the mobile phone. In this way, the user may answer the call directly over the mobile phone without answering the call over the pad.

Figure 15:
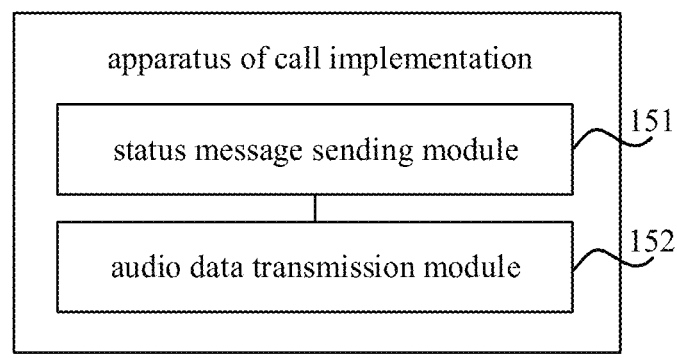
FIG. 15 is a block diagram of an apparatus of call implementation according to an example of the present disclosure.

On the basic of the method of call implementation, examples of the present disclosure also provide an apparatus of call implementation, applicable for a relay device. Referring to FIG. 15, the apparatus may include a status message sending module 151 and an audio data transmission module 152.

The status message sending module 151 is configured to, in response to detecting an incoming call event sent by a calling device, send a status message of the incoming call event to a relay device to enable the relay device prompts the incoming call event according to the status message; and The audio data transmission module 152 is configured to, after receiving a response message for the incoming call event from the relay device, transmit audio data through an audio connection between the called device and the relay device to implement a call between the relay device and the calling device.

In some examples, the apparatus further includes:
a generating module, configured to generate an audio connection request;
a request sending module, configured to send the audio connection request to the relay device; and
a determining module, configured to, in response to detecting an establishment response message returned by the relay device after responding to the audio connection request, determine that the audio connection is established.

In some examples, the audio connection includes at least one of a Bluetooth connection, a Wi-Fi connection, a ZigBee connection and an UWB connection.

In some examples, the apparatus further includes:
a first detecting module, configured to determine whether the called device supports a relay function; and
an establishing module, configured to, in response to determining that the called device supports the relay function, establish a Mirror connection with the relay device, in which the Mirror connection is configured to transmit the status message.

In some examples, the first detecting module includes:
a first acquiring unit, configured to acquire a model of the called device; and
a first determining unit, configured to determine whether the called device supports the relay function according to the model and a preset relay function model list.

In some examples, the first detecting module includes:
a second acquiring unit, configured to acquire one or more phone accounts that currently have registered by the called device, in which the phone account refers to an account registered for each phone call;
a judging unit, configured to determine whether the one or more phone accounts include an account representing a relay call or an account representing a local call;
a second determining unit, configured to, in response to determining that the one or more phone accounts include the account representing the relay call or the account representing the local call, determine that the called device does not support the relay function; and in response to determining the one or more phone accounts do not include the account representing the relay call and the account representing the local call both, determine that the called device supports the relay function;

In some examples, the apparatus further includes:
an updating module, configured to, update the status message when an update event is detected, in which the update event includes at least one of a call status update event and a contact message update event; and
a sending module, configured to send the updated status message to the relay device to enable the relay device to update the status message synchronously.

In some examples, the apparatus further includes:
a first display module, configured to display an in-call interface corresponding to the incoming call event, in which the in-call interface includes a local hang up button; and
a disconnecting module, configured to, in response to detecting that the local hang up button is triggered, ending a relay call, sending the updated status message to the relay device, and disconnecting the audio connection between the called device and the relay device.

In some examples, the audio data transmission module 152 includes:
- a third acquiring unit, configured to acquire first audio data sent by the calling device;
- a first converting unit, configured to convert the first audio data into a first byte sequence;
- a transmitting unit, configured to transmit the first byte sequence to the relay device through the audio connection.

In some examples, the audio data transmission module 152 includes:
- a fourth acquiring unit, configured to acquire second byte sequence transmitted by the relay device through the audio connection, in which the second byte sequence is obtained by the relay device acquiring and converting the second audio data;
- a second converting unit, configured to convert the second byte sequence into the second audio data and sending the second audio data to the calling device.

In some examples, the apparatus further includes:
- a second displaying module, configured to display an incoming call interface and display the status message on the incoming call interface.

In some examples, the apparatus further includes:
- an adjusting module, configured to adjust a priority level of the call to a target priority level, in which the target priority level is higher than a priority level of a next relay call.

In some examples, the status message sending module 151 further includes:
- a detecting unit, configured to, in a cast that the called device displays a relay device selection interface, detect whether a selection operation of selecting the relay device is received;
- a status message sending unit, configured to, in response to receiving the selection operation of selecting the relay device, send the status message of the incoming call event to the relay device corresponding to the selection operation.

In some examples, the apparatus further includes:
- an account sending module, configured to send a local designated account to a target server;
- a receiving module, configured to receive a device identification code returned by the target server according to the designated account, and determine the relay device according to the device identification code, in which the device identification code is an identification code of other devices uploading the designated account excluding the called device.

In some examples, the called device includes a preset switch for controlling whether a relay call is allowed, before sending the local designated account to the target server;

the apparatus further includes:
- a second detecting module, configured to detect a switching state of the preset switch, in which the switching state includes a switching-on state and a switching-off state;
- an executing module, configured to, in response to detecting that the switching state is the switching-on state, determine to execute the step of sending the local designated account to the target server.

It should be noted that the apparatus and device illustrated in this example match the method example. Reference may be made on the above method example and will not be repeated herein.

Figure 16:
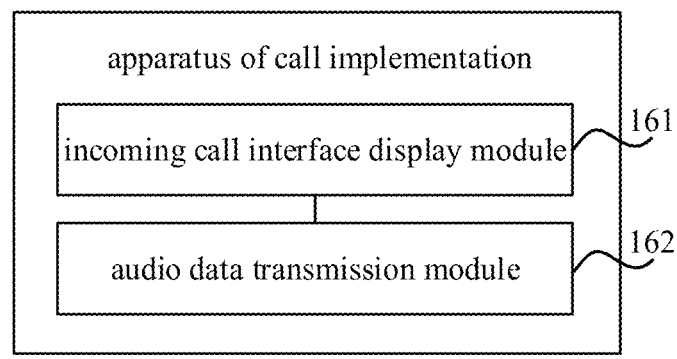
FIG. 16 is a block diagram of an apparatus of call implementation according to another example of the present disclosure.

On the basic of the method of call implementation, examples of the present disclosure also provide an apparatus of call implementation, applicable for a relay device. Referring to FIG. 16, the apparatus may include an incoming call interface display module 161 and an audio data transmission module 162.

The incoming call interface display module 161 is configured to display an incoming call interface in response to receiving a status message of an incoming call event sent by a called device;

The audio data transmission module 162 is configured to, in response to detecting an answer instruction based on the incoming call interface, transmit audio data through an audio connection between the relay device and the called device to implement a call between the relay device and the calling device via the called device.

In some examples, the audio data transmission module 162 includes:
- an acquiring unit, configured to acquire second audio data;
- a converting unit, configured to convert the second audio data into a second byte sequence;
- a transmitting unit, configured to transmit the second byte sequence to the called device through the audio connection between the relay device and the called device.

In some examples, the apparatus further includes:
- an updating module, configured to update the status message after detecting updated status message generated by the called device based on an update event, in which the update event includes at least one of a call status update event and a contact message update event.

In some examples, the apparatus further includes:
- a disconnecting module, configured to, after acquiring the status message including a local hang up of the called device, end the call and disconnect a Mirror connection between the relay device and the called device.

In some examples, the apparatus further includes:
- a displaying module, configured to display an in-call interface corresponding to the incoming call event, in which the in-call interface includes a hang up button;
- an ending module, configured to, in response to detecting an end call instruction based on the in-call interface, end a relay call;
- a sending module, configured to send an updated status message to the called device, to enable the called device to end the relay call and release the audio connection.

In some examples, the apparatus further includes:
- a clear module, configured to, perform at least one of: after a relay call is hung up, clearing a call record of the relay call; and, not writing the relay call into the call record.

It should be noted that the apparatus and device illustrated in this example match the method example. Reference may be made on the above method example and will not be repeated herein.

Examples of the present disclosure also provide an electronic device. The electronic device includes: a processor; a memory stored with a computer program executable by the processor; in which when the computer program is performed by the processor, the processor is caused to perform the above method.

Examples of the present disclosure also provide a computer-readable storage medium having a computer program stored. When the program is executed by a processor, the above method is implemented.

Figure 17:
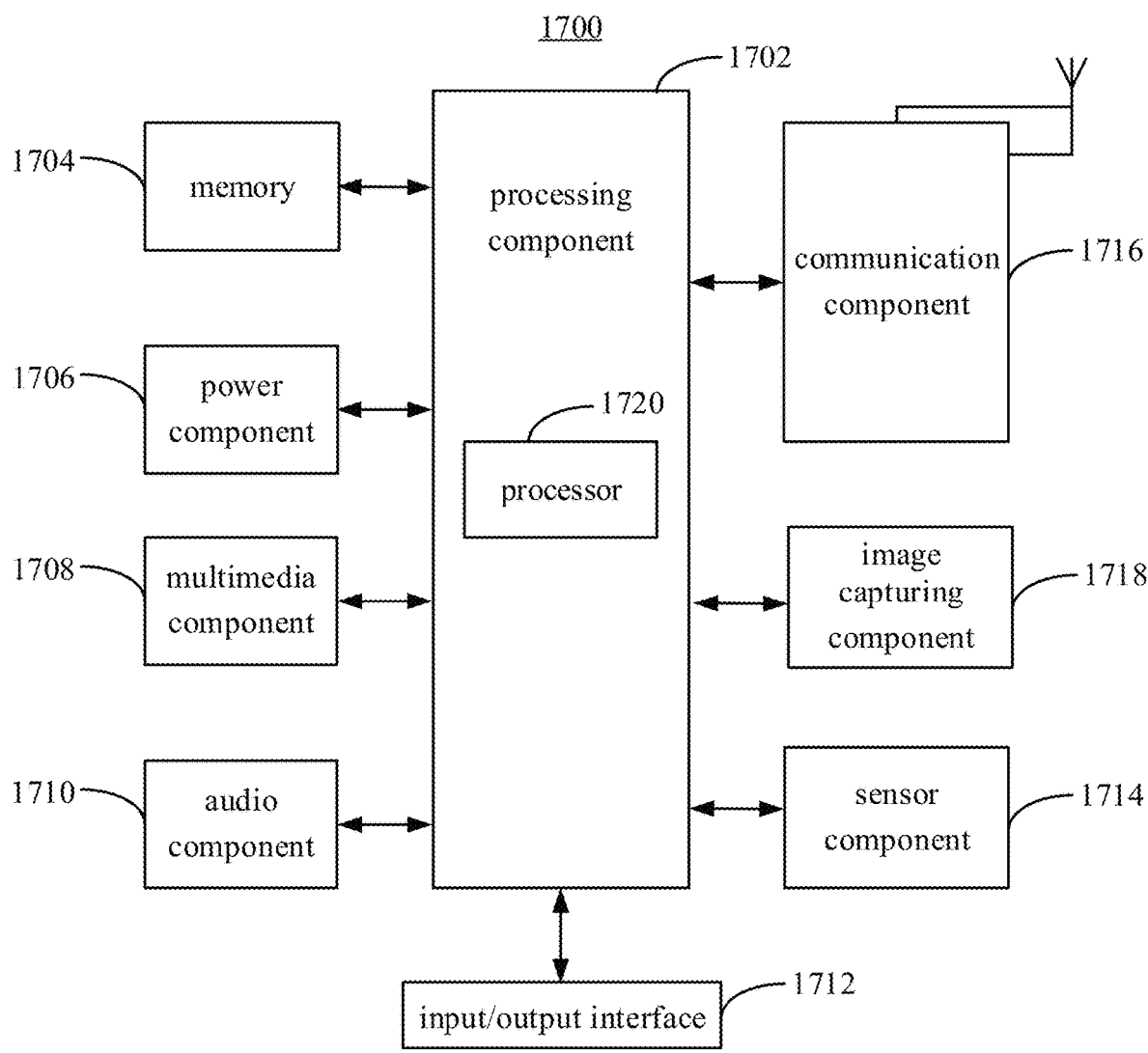
FIG. 17 is a block diagram of an electronic device according to an example of the present disclosure.

FIG. 17 is a block diagram of an electronic device. For example, an apparatus 1700 may be a mobile phone, a computer, a digital broadcast terminal, a messaging device, a game console, a tablet device, a medical device, an exercise device, a personal digital assistant, and so on.

Referring to FIG. 17, the device 1700 may include one or more of the following components: a processing component 1702, a memory 1704, a power component 1706, a multimedia component 1708, an audio component 1710, an input/output (I/O) interface 1712, a sensor component 1714, a communication component 1716 and an image capturing component 1718.

The processing component 1702 normally controls the overall operation (such as operations associated with displaying, telephone calls, data communications, camera operations and recording operations) of the device 1700. The processing component 1702 may include one or a plurality of processors 1020 to execute instructions so as to perform all or part of the steps of the above described method. In addition, the processing component 1702 may include one or a plurality of units to facilitate interactions between the processing component 1702 and other components. For example, the processing component 1702 may include a multimedia unit to facilitate interactions between the multimedia component 1708 and the processing component 1702.

The memory 1704 is configured to store various types of data to support operations at the device 1700. Examples of such data include instructions for any application or method operated on the device 1700, contact data, phone book data, messages, images, videos and the like. The memory 1704 may be realized by any type of volatile or non-volatile storage devices, or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 1706 provides power to various components of the device 1700. The power component 1706 may include a power management system, one or a plurality of power sources and other components associated with power generation, management, and distribution of the device 1700. The power module 1706 may include a power chip, and the controller may communicate with the power chip, to control the power chip to turn on or turn off switches, to enable a battery to supply power to a motherboard circuit or not.

The multimedia component 1708 includes a screen that provides an output interface between the device 1700 and the user. In some examples, the screen may include a liquid crystal display (LCD) and a touch panel (TP). If the screen includes a touch panel, the screen may be implemented as a touch screen to receive input signals from the user. The touch panel includes one or a plurality of touch sensors to sense touches, slides, and gestures on the touch panel. The touch sensor may sense not only the boundary of the touches or sliding actions, but also the duration and pressure related to the touches or sliding operations.

The audio component 1710 is configured to output and/or input an audio signal. For example, the audio component 1710 includes a microphone (MIC) that is configured to receive an external audio signal when the device 1700 is in an operation mode such as a call mode, a recording mode, and a voice recognition mode. The received audio signal may be further stored in the memory 1704 or transmitted via the communication component 1716. In some examples, the audio component 1710 further includes a speaker for outputting audio signals.

The I/O interface 1712 provides an interface between the processing component 1702 and a peripheral interface unit. The peripheral interface unit may be a keyboard, a click wheel, a button and so on. These buttons may include, but are not limited to, a home button, a volume button, a start button, and a locking button.

The sensor assembly 1714 includes one or a plurality of sensors for providing the device 1700 with various aspects of status assessments. For example, the sensor component 1714 may detect an ON/OFF state of the device 1700 and a relative positioning of the components. For example, the components may be a display and a keypad of the device 1700. The sensor component 1714 may also detect a change in position of the device 1700 or a component of the device 1700, the presence or absence of contact of the user with the device 1700, the orientation or acceleration/deceleration of the device 1700 and a temperature change of the device 1700. The sensor component 1714 may include a proximity sensor configured to detect the presence of nearby objects without any physical contact. The sensor component 1714 may also include a light sensor (such as a CMOS or a CCD image sensor) for use in imaging applications. In some examples, the sensor component 1714 may further include an acceleration sensor, a gyro sensor, a magnetic sensor, a pressure sensor, or a temperature sensor.

The communication component 1716 is configured to facilitate wired or wireless communication between the device 1700 and other devices. The device 1700 may access a wireless network based on a communication standard such as Wi-Fi, 2G, 3G, 4G, or 5G, or a combination thereof. In some examples, the communication component 1716 receives broadcast signals or broadcast-associated information from an external broadcast management system via a broadcast channel. In some examples, the communication component 1716 further includes a near field communication (NFC) module to facilitate short range communication. For example, the NFC module may be implemented based on radio frequency identification (RFID) technology, infrared data association (IrDA) technology, ultra-wideband (UWB) technology, Bluetooth (BT) technology and other technologies.

In some examples, the device 1700 may be implemented by one or a plurality of application specific integrated circuits (ASICs), digital signal processors (DSPs), digital signal processing devices (DSPDs), programmable logic devices (PLDs), field programmable gate arrays (FPGA), controllers, microcontrollers, microprocessors, or other electronic components, so as to perform the above touch control method.

In a sixth aspect, in some examples of the present disclosure, there is also provided a non-transitory computer readable storage medium including instructions, such as a memory 1704 including instructions. The instructions are executable by the processor 1020 of the device 1700 to perform the above method. For example, the non-transitory computer readable storage medium may be a ROM, a random access memory (RAM), a CD-ROM, a magnetic tape, a floppy disk, an optical data storage device, etc.

Other examples of the present disclosure will be apparent to those skilled in the art after considering the specification and practicing the present disclosure disclosed herein. The present disclosure is intended to cover any variations, uses or adaptive changes of the present disclosure, which are in accordance with general principles of the present disclosure and include common knowledge or technical means in the art that are not disclosed herein. The specification and examples are to be regarded as illustrative only, and the real scope and spirit of the present disclosure are pointed out in the attached claims.

It is understood that the present disclosure is not limited to the precise structures described above and illustrated in the drawings, and various modifications and changes may be made without departing from the scope thereof. The scope of the present disclosure is merely limited by the attached claims.

What is claimed is:

1. A method of call implementation, comprising:
in response to detecting an incoming call event sent by a calling device, sending, by a called device, a status message of the incoming call event to a relay device to enable the relay device prompts the incoming call event according to the status message; and
after receiving a response message for the incoming call event from the relay device, transmitting, by the called device, audio data through an audio connection between the called device and the relay device to implement a call between the relay device and the calling device;
wherein the method further comprises:
determining whether the called device supports a relay function; and
in response to determining that the called device supports the relay function, establishing a Mirror connection with the relay device, wherein the Mirror connection is configured to transmit the status message.

2. The method according to claim 1, further comprising:
generating an audio connection request;
sending the audio connection request to the relay device; and
in response to detecting an establishment response message returned by the relay device after responding to the audio connection request, determining that the audio connection is established.

3. The method according to claim 1, wherein determining whether the called device supports the relay function comprises:
acquiring a model of the called device; and
determining whether the called device supports the relay function according to the model and a preset relay function model list.

4. The method according to claim 1, wherein determining whether the called device supports the relay function comprises:
acquiring one or more phone accounts that are currently registered by the called device, wherein a phone account refers to an account registered for each phone call;
determining whether the one or more phone accounts comprise an account representing a relay call or an account representing a local call;
in response to determining that one or more phone accounts comprise the account representing the relay call or the account representing the local call, determining that the called device does not support the relay function; and
in response to determining the one or more phone accounts do not include the account representing the relay call and the account representing the local call both, determining that the called device supports the relay function.

5. The method according to claim 1, further comprising:
updating the status message in response to detecting an update event, wherein the update event comprises at least one of a call status update event or a contact message update event; and
sending the updated status message to the relay device to enable the relay device to update the status message synchronously.

6. The method according to claim 1, further comprising:
displaying an in-call interface corresponding to the incoming call event, wherein the in-call interface comprises a local answer button; and
in response to detecting that the local answer button is triggered, switching to a local connection for call, and disconnecting the audio connection between the called device and the relay device.

7. The method according to claim 1, further comprising:
displaying an in-call interface corresponding to the incoming call event, wherein the in-call interface comprises a local hang up button; and
in response to detecting that the local hang up button is triggered, ending a relay call, sending the updated status message to the relay device, and disconnecting the audio connection between the called device and the relay device.

8. The method according to claim 1, wherein transmitting the audio data through the audio connection between the called device and the relay device comprises:
acquiring first audio data sent by the calling device;
converting the first audio data into a first byte sequence; and
transmitting the first byte sequence to the relay device through the audio connection.

9. The method according to claim 1, wherein transmitting the audio data through the audio connection between the called device and the relay device comprises:
acquiring second byte sequence transmitted by the relay device through the audio connection, wherein the second byte sequence is obtained by the relay device acquiring and converting the second audio data; and
converting the second byte sequence into the second audio data and sending the second audio data to the calling device.

10. The method according to claim 1, after transmitting the audio data through the audio connection, the method further comprising:
adjusting a priority level of the call to a target priority level, wherein the target priority level is higher than a priority level of a next relay call.

11. The method according to claim 1, further comprising:
sending a local designated account to a target server; and
receiving a device identification code returned by the target server according to the designated account, and determining the relay device according to the device identification code, wherein the device identification code is an identification code of other devices uploading the designated account excluding the called device.

12. The method according to claim 11, wherein the called device comprises a preset switch for controlling whether a relay call is allowed, before sending the local designated account to the target server, the method further comprises:
detecting a switching state of the preset switch, wherein the switching state comprises a switching-on state and a switching-off state; and in response to detecting that the switching state is the switching-on state, determining to execute the step of sending the local designated account to the target server.

13. A method of call implementation, comprising:
   displaying, by a relay device, an incoming call interface in response to receiving a status message of an incoming call event sent by a called device; and
   in response to detecting an answer instruction based on the incoming call interface, transmitting, by the relay device, audio data through an audio connection between the relay device and the called device to implement a call between the relay device and a calling device via the called device;
   wherein the status message is received through a Mirror connection with the called device, wherein the Mirror connection is established by called device in response to determining that the called device supports a relay function.

14. The method according to claim 13, wherein transmitting the audio data through the audio connection between the relay device and the called device comprises:
   acquiring second audio data;
   converting the second audio data into a second byte sequence; and
   transmitting the second byte sequence to the called device through the audio connection between the relay device and the called device.

15. The method according to claim 13, further comprising:
   updating the status message after detecting updated status message generated by the called device based on an update event, wherein the update event comprises at least one of a call status update event or a contact message update event.

16. The method according to claim 13, further comprising:
   after acquiring the status message comprising a local hang up of the called device, ending the call and disconnecting a Mirror connection between the relay device and the called device.

17. The method according to claim 13, further comprising:
   displaying an in-call interface corresponding to the incoming call event, wherein the in-call interface comprises a hang up button; and
   in response to detecting an end call instruction based on the in-call interface, ending a relay call, and sending an updated status message to the called device, to enable the called device to end the relay call and release the audio connection.

18. The method according to claim 13, further comprising at least one of:
   after a relay call is hung up, clearing a call record of the relay call; or
   not writing the relay call into the call record.

19. A called device for call implementation, comprising:
   a processor;
   a memory stored with a computer program executable by the processor;
   wherein when the computer program is performed by the processor, the processor is configured to:
   in response to detecting an incoming call event sent by a calling device, send a status message of the incoming call event to a relay device to enable the relay device prompts the incoming call event according to the status message; and
   after receiving a response message for the incoming call event from the relay device, transmit audio data through an audio connection between the called device and the relay device to implement a call between the relay device and the calling device;
   wherein the processor is configured to:
   determine whether the called device supports a relay function; and
   in response to determining that the called device supports the relay function, establish a Mirror connection with the relay device, wherein the Mirror connection is configured to transmit the status message.

* * * * *